(12) United States Patent
Kawakami et al.

(10) Patent No.: US 12,248,391 B2
(45) Date of Patent: Mar. 11, 2025

(54) DEFECT ANALYSIS APPARATUS, PROGRAM, AND DEFECT ANALYSIS METHOD

(71) Applicant: Hitachi, Ltd., Tokyo (JP)

(72) Inventors: Masumi Kawakami, Tokyo (JP); Yasufumi Suzuki, Tokyo (JP)

(73) Assignee: Hitachi, Ltd., Tokyo (JP)

(*) Notice: Subject to any disclaimer, the term of this patent is extended or adjusted under 35 U.S.C. 154(b) by 89 days.

(21) Appl. No.: 18/015,266

(22) PCT Filed: Feb. 25, 2021

(86) PCT No.: PCT/JP2021/007054
§ 371 (c)(1),
(2) Date: Jan. 9, 2023

(87) PCT Pub. No.: WO2022/044376
PCT Pub. Date: Mar. 3, 2022

(65) Prior Publication Data
US 2023/0259447 A1 Aug. 17, 2023

(30) Foreign Application Priority Data
Aug. 27, 2020 (JP) ................ 2020-143591

(51) Int. Cl.
*G06F 11/36* (2006.01)
*G06F 11/362* (2025.01)
(52) U.S. Cl.
CPC ............... *G06F 11/3636* (2013.01)
(58) Field of Classification Search
None
See application file for complete search history.

(56) References Cited

U.S. PATENT DOCUMENTS

2023/0259447 A1* 8/2023 Kawakami .......... G06F 11/3636
717/128

FOREIGN PATENT DOCUMENTS

JP 2012-128727 A 7/2012
JP 2016-18253 A 2/2016

OTHER PUBLICATIONS

Agrawal, "An Execution Backtracking Approach to Program Debugging", 1991, IEEE (Year: 1991).*
Zamfir, "Execution Synthesis: A Technique for Automated Software Debugging", 2010, ACM (Year: 2010).*
Chi, "Backward Slicing Analysis on Debug Log for Crash Comprehension", 2020, ACM (Year: 2020).*

(Continued)

*Primary Examiner* — Hossain M Morshed
(74) *Attorney, Agent, or Firm* — Crowell & Moring LLP (57) ABSTRACT

A defect analysis apparatus includes an execution log (program execution log) of a program (source code) in an input. The defect analysis apparatus includes an analysis start point acquisition unit configured to acquire, from the execution log and as an analysis start point, a statement of the program in which an exception occurs; an analysis end point acquisition unit configured to acquire, as an analysis end point, a function directly or indirectly calling a function including the analysis start point; and a symbolic execution engine configured to perform reverse symbolic execution from the analysis start point to the analysis end point and output an execution path.

6 Claims, 7 Drawing Sheets

(56) References Cited

OTHER PUBLICATIONS

Agrawal, "An Execution Backtracking Approach to Program Debugging", 1991, Purdue University (Year: 1991).*
Zamfir2013, "Execution Synthesis: A Technique for Automated Software Debugging", 2013, École Polytechnique Fédérale De Lausanne (Year: 2013).*
Dinges, "Targeted Test Input Generation Using Symbolic-Concrete Backward Execution", 2014, ACM (Year: 2014).*
Chen, "STAR: Stack Trace Based Automatic Crash Reproduction via Symbolic Execution", 2014, IEEE (Year: 2014).*
International Search Report (PCT/ISA/210) issued in PCT Application No. PCT/JP2021/007054 dated May 25, 2021 with English translation (five (5) pages).
Japanese-language Written Opinion (PCT/ISA/237) issued in PCT Application No. PCT/JP2021/007054 dated May 25, 2021 (three (3) pages).
Chen et al., "STAR: Stack Trace Based Automatic Crash Reproduction via Symbolic Execution," IEEE Transactions on Software Engineering [online], 2015, pp. 198-220, vol. 41, No. 2, Internet: URL:https://ieeexplore.ieee.org/stalnp/stamp.jsp?tp=&arnumber-6926857 (three (3) pages).

\* cited by examiner

DEFECT ANALYSIS APPARATUS, PROGRAM, AND DEFECT ANALYSIS METHOD

TECHNICAL FIELD

The present invention relates to a defect analysis apparatus, a program, and a defect analysis method of supporting analysis of defects in a software program.

BACKGROUND ART

In software development, an operation of software (program, software program) different from a specification or not expected by a developer is called as a defect, and it is desirable to correct and eliminate all defects before releasing the software. As a general method for detecting defects, there is a test. In the test, an input and an output in the specification or expected by the developer are created as a test case, and it is confirmed whether the program returns a correct output with respect to the input. When the output is different from the input or when an exception (fault) occurs and the program does not operate, it is determined that there is a defect (a defect occurs). When there is a defect, the developer analyzes which part of the software is unexpectedly processed, specifies a cause part, and corrects a logic of the program to perform appropriate input and output.

In a huge and complicated program, many test cases are required. Specifically, in order to cover all statements (lines/steps), branches, conditional branches, and the like of the program, a huge number of test cases are required, which is not realistic. In a control program for calculating an output based on an input, most of inputs are correctly processed, but illegal processing may be performed under very rare conditions. Such a defect is called as a non-repeatable defect, and it is difficult to specify a rare condition under which the defect occurs.

When the non-repeatable defect is found immediately before shipment, an analysis of the defect takes a very long time, and the shipment may be delayed. In addition, when the non-repeatable defect is found after the shipment, there are few clues that cause the non-repeatable defect, and therefore, it is very difficult to analyze the causes. If a defect occurs with a certain probability, product collection or recall for product correction must be performed. Since the shipment delay, the product collection, and the recall damage user's reliability and further require an extraordinary high cost, it is desirable to avoid those as much as possible.

PTL 1 describes a method of evaluating fault propagation at the time of fault of a software component in which an input specification and an output specification are defined, by determining which output cannot satisfy the specifications with respect to an input that violates the specifications in the software component.

CITATION LIST

Patent Literature

PTL 1: JP2012-128727A

SUMMARY OF INVENTION

Technical Problem

In the method described in PTL 1, a behavior of the software component when an abnormal input is given can be evaluated, but a cause of a defect that an abnormal output occurs with respect to a normal input cannot be analyzed.

The invention has been made in view of such a background, and an object thereof is to provide a defect analysis apparatus, a program, and a defect analysis method that enable identification of an execution path in which a defect included in a program occurs.

Solution to Problem

In order to solve the above problem, a defect analysis apparatus according to the invention includes: an analysis start point acquisition unit configured to acquire a statement of a program in which an exception occurs as an analysis start point from an execution log when analyzing a defect of a program based on the execution log of the program; an analysis end point acquisition unit configured to acquire, as an analysis end point, a function directly or indirectly calling a function including the analysis start point; and a symbolic execution engine configured to perform reverse symbolic execution from the analysis start point to the analysis end point and output an execution path.

Advantageous Effects of Invention

According to the invention, it is possible to provide a defect analysis apparatus, a program, and a defect analysis method that enable identification of an execution path in which a defect included in the program occurs.

DESCRIPTION OF EMBODIMENTS

A defect analysis apparatus according to an embodiment of the invention will be described below. An input of the defect analysis apparatus includes a source code of a program and an execution log of the program. The execution log includes a function (method) called during execution. When an exception (for example, division by 0) occurs during the execution, the execution log is finished by calling a function where the exception occurs (program stop is recorded).

The defect analysis apparatus sets, from the execution log and as an analysis start point, a statement (row/step of the source code) of a program in which an exception occurs (for example, division calculation of division by 0) in functions where the exception occurs. In addition, a function directly or indirectly calling a function including the analysis start point is set as an analysis end point by inquiring a user (developer).

The defect analysis apparatus performs reverse symbolic execution from the analysis start point to the analysis end point, which is an inverse of normal program execution. During the reverse symbolic execution, the defect analysis apparatus records an execution path and a path condition. The execution path is a path (arrangement of statements/ rows/steps) in a program connecting the analysis end point and the analysis start point, and the process proceeds along the execution path. The execution path also includes a function call. The path condition is a condition of a variable where the exception (for example, division by 0) occurs. The variable includes a local variable in the function and an input parameter of the function.

By referring to the execution path and the path condition, the user can understand how the exception (defect) occurs, and can use as a material for examining a method of correcting the defect. As a result, the defect analysis apparatus can support analysis of the defect of the user.

The defect analysis apparatus calculates an input parameter value of a function, which is an analysis end point satisfying the path condition, by using a satisfiability modulo theories solver (SMT solver). By performing a test using this value as an input, the user can confirm whether a corrected program correctly operates.

<<Configuration of Defect Analysis Apparatus>>

Figure 1:
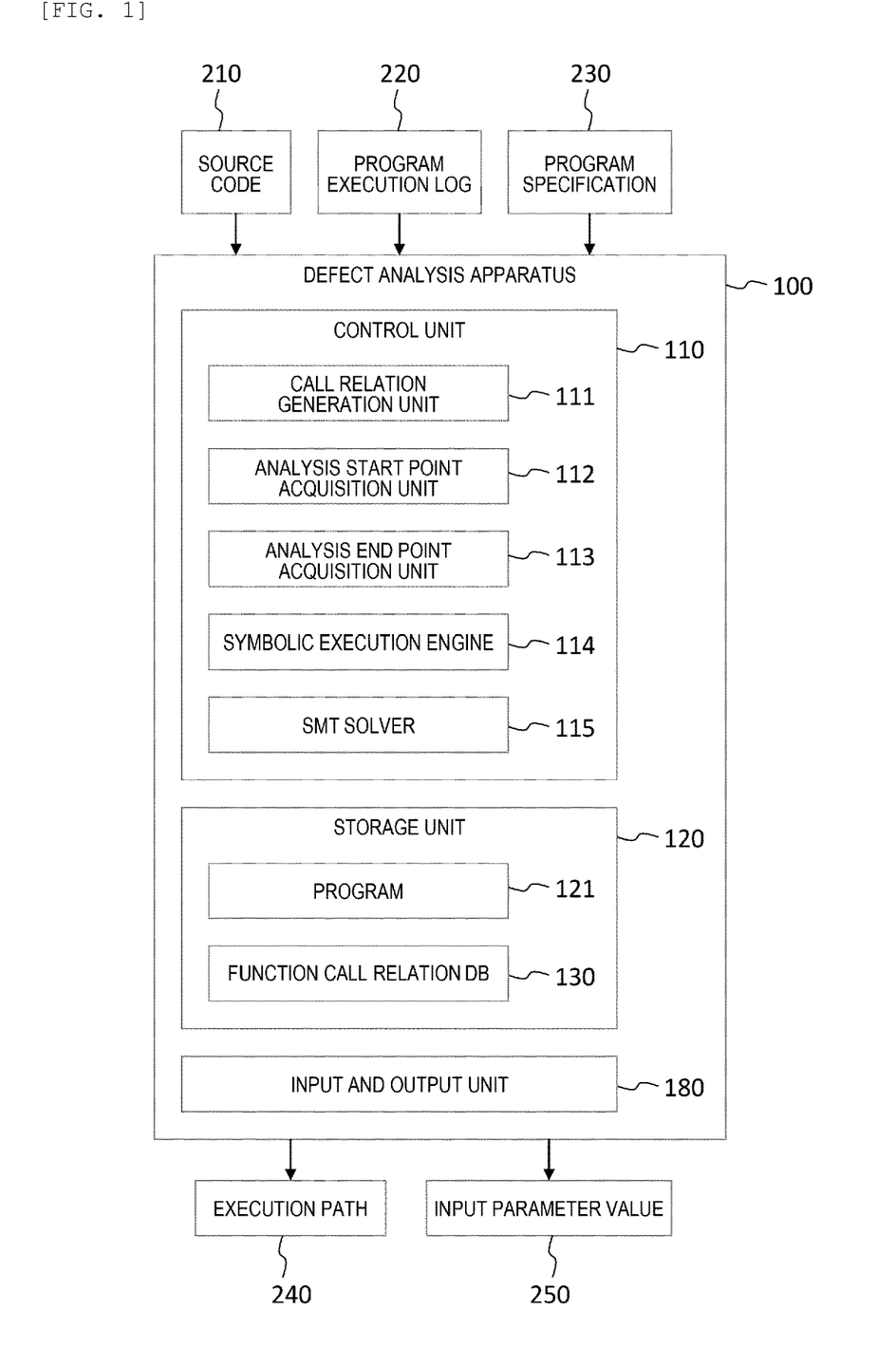
FIG. 1 is a diagram showing an input, an output, and an overall configuration of a defect analysis apparatus according to the present embodiment.

FIG. 1 is a diagram showing an input, an output, and an overall configuration of a defect analysis apparatus 100 according to the present embodiment. The defect analysis apparatus 100 includes a control unit 110, a storage unit 120, and an input and output unit 180.

The input and output unit 180 includes a display and a user interface such as a keyboard or a mouse. The input and output unit 180 may further include a communication interface and a read and write device of a recording medium.

The storage unit 120 includes a random access memory (RAM), a read only memory (ROM), a solid state drive (SSD), and the like. The storage unit 120 stores a program 121 and a function call relation database 130 (described as a function call relation DB (database) in FIG. 1). The program 121 is a program for causing a computer to function as the defect analysis apparatus 100, and includes a description of a processing procedure of defect analysis processing (see FIG. 5 described later). The function call relation database 130 stores a call relation between functions, in other words, data indicating a call relation graph (a graph of a control flow representing a call relation between functions).

Before describing the control unit 110, the input and the output of the defect analysis apparatus 100 will be described.

<<Input of Defect Analysis Apparatus>>

The input of the defect analysis apparatus 100 includes a source code 210, a program execution log 220, and a program specification 230. The source code 210 is a source code of a function (method) constituting a software program that is an analysis object. The program specification 230 describes a name of a function, and a name, a type, and a range of an input parameter value and a return value of the function.

The program execution log 220 (execution log) includes a record of the function call during execution of the program. The program execution log 220 may include the input parameter value at the time of the call and a return value at the time of returning from the call, in addition to a name (identification information) of a called function. The program execution log 220 may further include an exception that occurs during the execution of the program. The exception includes division by 0 and a violation of the input parameter value or the return value described in the program specification 230 (a value outside the range of the specification).

<<Output of Defect Analysis Apparatus>>

The output of the defect analysis apparatus 100 includes an execution path 240 and an input parameter value 250. The execution path 240 is a path (a series of statements/rows/ steps that are processed in order in the source code 210) in a program in which a defect occurs. One end of the execution path 240 is a statement/row/step in which an exception (fault) according to a defect occurs, and is referred to as the analysis start point or simply a start point. The analysis start point is, for example, a statement including a division calculation in which the division by 0 occurs. The other end of the execution path 240 is a function directly or indirectly calling the function including the analysis start point, and is referred to as the analysis end point or an entry point. The analysis end point may be a function including the start point.

The input parameter value 250 is an input parameter value of a function serving as the entry point when a defect occurs.

<<Configuration of Control Unit of Defect Analysis Apparatus>>

The control unit 110 includes a central processing unit (CPU), and includes a call relation generation unit 111, an analysis start point acquisition unit 112, an analysis end point acquisition unit 113, a symbolic execution engine 114, and an SMT solver 115.

The call relation generation unit 111 acquires a call relation of functions from the source code 210 and stores the call relation in the function call relation database 130.

The analysis start point acquisition unit 112 analyzes the program execution log 220 to acquire the analysis start point. A procedure of acquiring the analysis start point will be described in detail later.

The analysis end point acquisition unit 113 (entry point acquisition unit) acquires, from the function call relation database 130, a function calling the function including the analysis start point, and displays the function as a candidate for the entry point on a display provided in the input and output unit 180. The user (developer) selects one or more entry points from candidates. The analysis end point acquisition unit 113 sets the selected function as the analysis end point (entry point).

The symbolic execution engine 114 generates an execution path 240 and a path condition. The path condition is a condition of a variable (a local variable and an input parameter) for the execution of the program to be analyzed to pass through the execution path 240. Details of the execution path 240 and the path condition will be described later. Details of the symbolic execution engine are described in the following documents: Peter Dinges and Gul Agha, "Targeted Test Input Generation Using Symbolic Concrete Backward Execution".

The SMT solver 115 (solver) generates the input parameter value 250 that satisfies the path condition. The satisfiability modulo theories solver is described in the following documents: Leonardo de Moura and Nikolaj Bjorner, "Z3: An Efficient SMT Solver".

<<Execution Path and Path Condition>>

Figure 2:
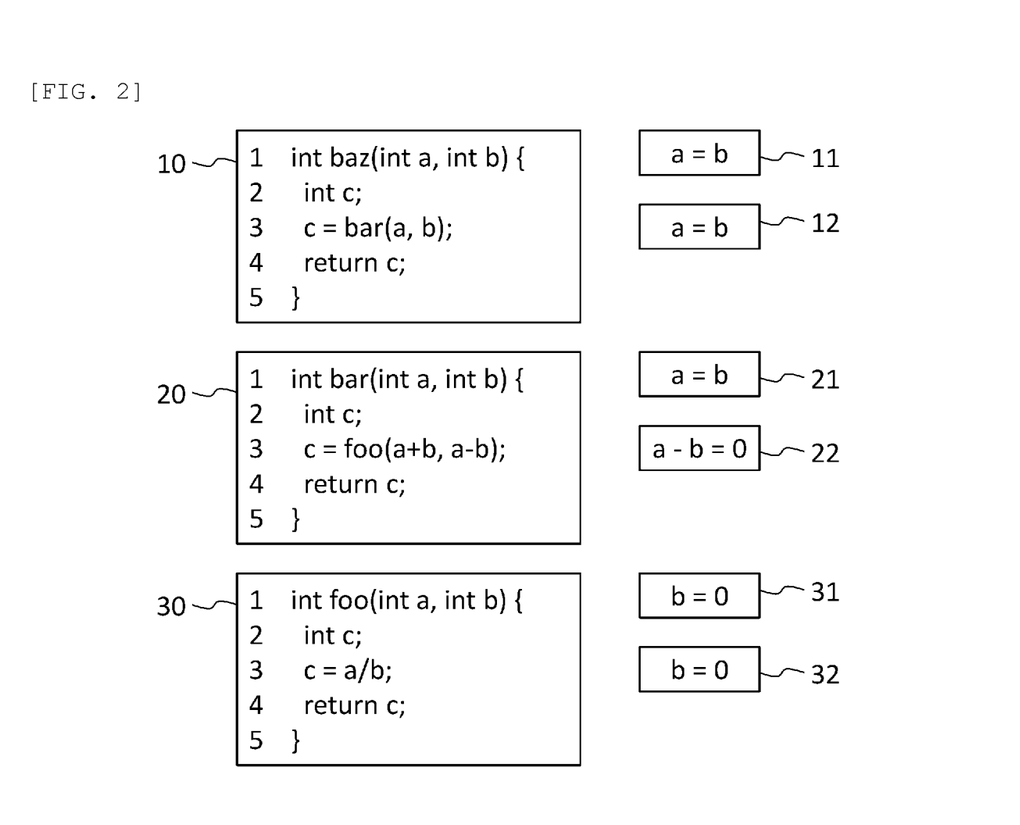
FIG. 2 is a diagram illustrating an execution path and a path condition according to the present embodiment.

FIG. 2 is a diagram illustrating an execution path and a path condition according to the present embodiment. FIG. 2 includes the source code 210 of three functions of a function baz 10, a function bar 20, and a function foo 30. The function baz 10 calls the function bar 20, and the function bar 20 calls the function foo 30. The description will be continued on a premise that an exception of the division by 0 occurs in the function foo 30 and the function baz 10 is designated as the entry point. In this case, the program execution log 220 includes a record of the call of the function baz 10, a record of the call of the function bar 20, and a record of the call of the function foo 30, and ends with a record of the occurrence of the division by 0.

By analyzing the program execution log 220, the analysis start point acquisition unit 112 detects that the exception of the division by 0 occurs in the function foo 30. Since a line 3 of the function foo is a unique statement/line including the division calculation, the analysis start point acquisition unit 112 sets the start point in the line 3 of the function foo 30. That is, the analysis start point acquisition unit 112 acquires, from the execution log and as the analysis start point, a statement of a program where an exception occurs.

The path condition is a condition/constraint under which an exception occurs. A path condition 32 in the line 3 of the function foo 30, which is the analysis start point, is "b=0".

The symbolic execution engine 114 searches (also referred to as reverse symbolic execution), from the start point to the entry point, the program (source code 210) in a direction opposite from normal (forward) execution. When there are a plurality of entry points, the symbolic execution engine 114 searches until reaching any one of the entry points.

In the case in FIG. 2, the symbolic execution engine 114 starts the searching from the line 3 of the function foo 30 and reaches a line 1 (head line). The execution path at this time is from the line 3 to the line 1 of the function foo 30. A path condition 31 in the line 1 remains "b=0".

The symbolic execution engine 114 determines that the function foo 30 is called by b of a second input parameter being 0, and searches for a statement where the function foo 30 is called. In the case in FIG. 2, the statement where the function foo 30 is called is a line 3 of the function bar 20, and the symbolic execution engine 114 continues the searching from the line. A path condition 22 in this line is "a−b=0" where the second input parameter is 0. The execution path at this time point is from the line 3 to the line 1 of the function foo 30 and then the line 3 of the function bar 20. In addition, the path condition at this time is "b=0" in the function foo 30 and "a−b=0" in the function bar 20. The function baz 10, the function bar 20, and the function foo 30 have variables a, b, and c of the same name, respectively, which are local variables of the function and are different variables.

The symbolic execution engine 114 starts searching from the line 3 to a line 1 of the function bar 20. The execution path at this time point is from the line 3 to the line 1 of the function foo 30 and then from the line 3 to the line 1 of the function bar 20. A path condition 21 in the line 1 is "a=b", which is the same as "a−b=0" of the path condition 22.

The symbolic execution engine 114 determines that the function bar 20 is called by a first parameter and a second input parameter being the same value, and searches for a statement where the function bar 20 is called. In the case in FIG. 2, the statement where the function bar 20 is called is a line 3 of the function baz 10, and the symbolic execution engine 114 continues the searching from the line. A path condition 12 in this line is "a=b". The execution path at this time point is from the line 3 to the line 1 of the function foo 30, from the line 3 to the line 1 of the function bar 20, and then the line 3 of the function baz 10. In addition, the path condition at this time point is "b=0" in the function foo 30, "a−b=0" in the function bar 20, and "a=b" in the function baz 10.

The symbolic execution engine 114 starts the searching from the line 3 to a line 1 of the function baz 10. Since the function baz 10 is the analysis end point, the searching ends here. The execution path at this time point is from the line 3 to the line 1 of the function foo 30, from the line 3 to the line 1 of the function bar 20, and then from the line 3 to the line 1 of the function baz 10. In addition, the path condition at this time point is "b=0" in the function foo 30, "a−b=0" in the function bar 20, and "a=b" in the function baz 10.

The path condition includes a condition of an input parameter value of the entry point (analysis end point). The SMT solver 115 solves the path condition, and calculates the input parameter value 250 of the function baz 10 that is the entry point, which satisfies the path condition, for example, b=0 with a=0.

Finally, the symbolic execution engine 114 displays the execution path on a display provided in the input and output unit 180 (outputs the execution path). The user can understand under what condition and how the processing proceeds and a defect occurs in the program. In addition, it is possible to find a problem and correct the program. The SMT solver 115 provides the input parameter value 250 (an input value of the entry point (analysis end point) that satisfies the path condition), and the user can test the program corrected using this value.

In the above description, the number of statements of call sources of the function foo 30 and the function bar 20 is one. When there are a plurality of call sources, the searching is continued from each call source. For example, it is assumed that a function baz A (not shown) calls a bar (d+1, d−2) and the function bar 20 in a line 5. The symbolic execution engine 114 searches to the line 5 of the function baz A to obtain a path condition. In this case, since the first parameter and the second parameter, which are the path condition of the function bar 20, are equal to each other, "d+1=d−2" is the path condition. However, since such a condition is not satisfied, the symbolic execution engine 114 terminates the searching from the line 5 of the function baz A and continues the searching of another call source.

When a plurality of call sources are searched and each of the call sources reaches the entry point, the symbolic execution engine 114 may record the execution path and the path condition of each of the call sources. In such a case, there are a plurality of execution paths and path conditions. In other words, it is determined that an exception occurs at the same position (analysis start point) under different conditions.

When there is a conditional branch in the middle of the searching, the symbolic execution engine 114 adds the branch condition to the path condition. For example, it is assumed that the line 3 of the function foo 30 is "if (x<=y) c=a/b;". The path condition in this case is "b=0" and "x<=y".

When a plurality of analysis end points are designated, a plurality of call sources of a function are present, or a conditional branch is present, a plurality of analysis end points, execution paths, and path conditions found by the searching may be present. The symbolic execution engine 114 calculates and specifies the execution paths and the path conditions in this way.

<<User Interface>>

Figure 3:
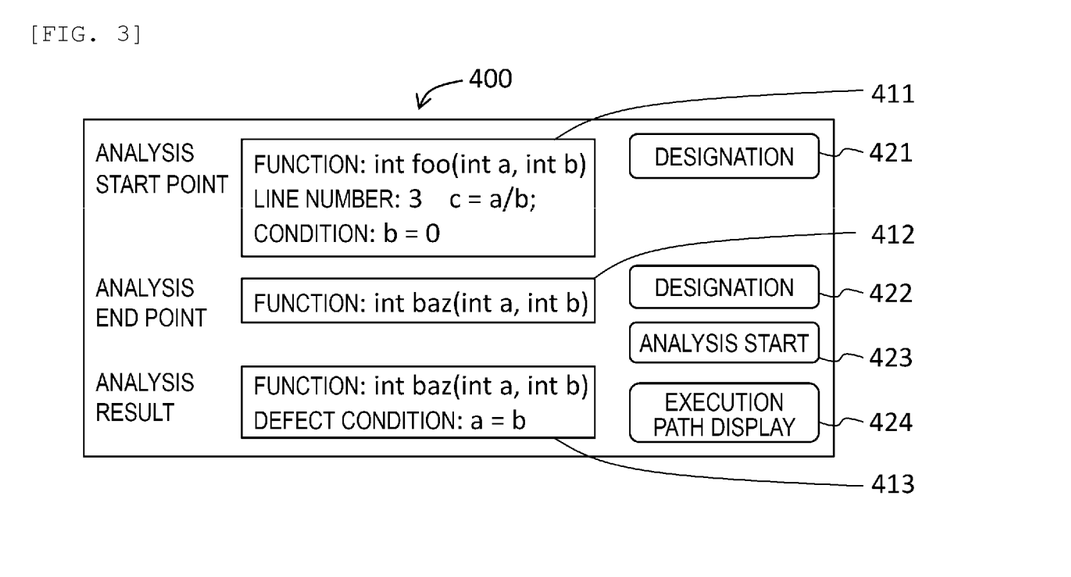
FIG. 3 is a configuration diagram of a screen of the defect analysis apparatus according to the present embodiment.

FIG. 3 is a configuration diagram of a screen 400 of the defect analysis apparatus 100 according to the present embodiment. An analysis start point information display region 411, an analysis end point information display region 412, and an analysis result information display region 413 are arranged from a top in a center of left and right of the screen 400.

When the analysis start point acquisition unit 112 sets the analysis start point, a function name including the analysis start point, a line number of the analysis start point, a condition under which an exception occurs, and the like are displayed in the analysis start point information display region 411. For example, when the exception of the division by 0 occurs and there are a plurality of division calculations, there are a plurality of candidates for the analysis start point. In such a case, there are a plurality of candidates for the analysis start point in the information display region 411, and a message of prompting the user to select one of the candidates is displayed. The user presses a "designation" button 421 to select one analysis start point from a screen (not shown) displaying the candidates for the analysis start point. The analysis start point acquisition unit 112 sets the selected candidate for the analysis start point as the analysis start point.

At a time point immediately after the defect analysis apparatus 100 is started (before a defect analysis process shown in FIG. 5 described later), a message of prompting selection of the analysis end point (entry point) is displayed in the analysis end point information display region 412. The user presses a "designation" button 422 to select one or more analysis end points from a screen (not shown) that displays candidates for the analysis end point (a function including the start point, or a function directly or indirectly calling the function). The analysis end point acquisition unit 113 sets the selected candidates for the analysis end point as the analysis end point, and displays the selected candidate in the information display region 412. When a plurality of analysis end points are selected, the plurality of analysis end points are displayed in the information display region 412.

When an "analysis start" button 423 is pressed, the symbolic execution engine 114 searches for the execution path, and the found analysis end point and the path condition related to the input parameter of the analysis end point are displayed in the analysis result information display region 413. If there are a plurality of analysis end points or the path condition related to a plurality of input parameters, the plurality of analysis end points or the path condition are displayed in the information display region 413. When an "execution path display" button 424 is pressed, an execution path display screen 430 (see FIG. 4 described later) is displayed on the display provided in the input and output unit 180.

Figure 4:
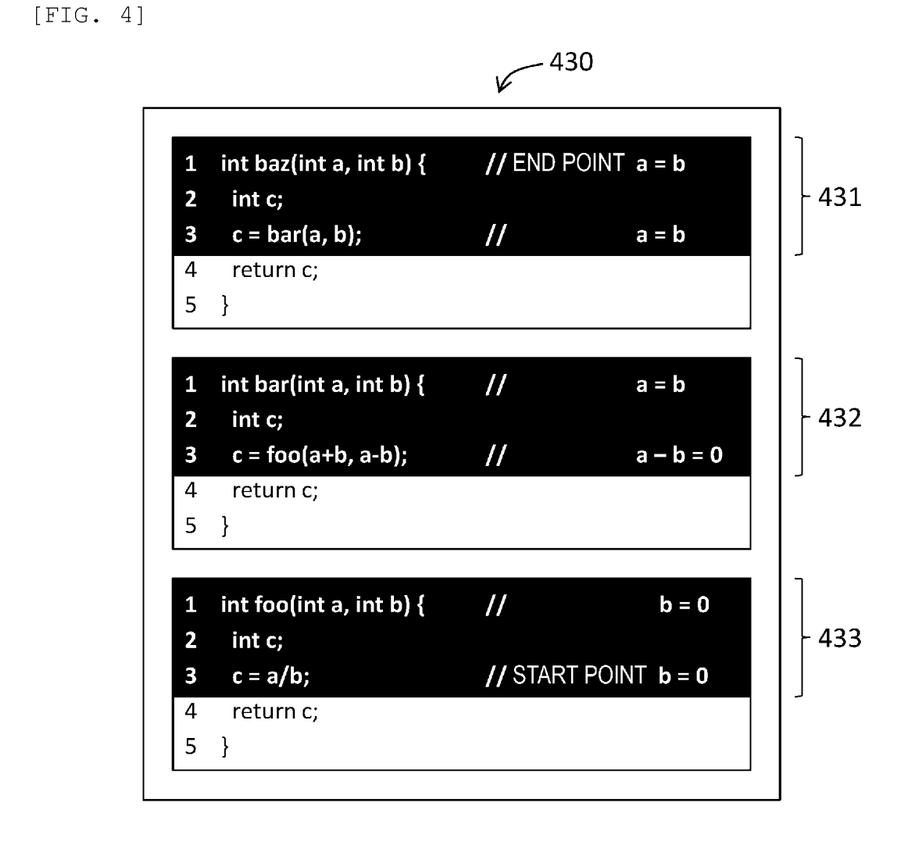
FIG. 4 is a configuration diagram of an execution path display screen according to the present embodiment.

FIG. 4 is a configuration diagram of the execution path display screen 430 according to the present embodiment. The execution path display screen 430 displays the source codes of the function baz 10, the function bar 20, and the function foo 30 through which the execution path passes. In the source codes of the function baz 10, the function bar 20, and the function foo 30, statements serving as the execution paths 431, 432, and 433 are highlighted. In addition, a "start point" is displayed as a comment of the program in the statement of the analysis start point, and an "end point" is displayed as a comment of the program in a statement of a function name of the entry point. Further, the path condition is displayed as the comments of the program in correspondence with the statements. By confirming the execution path indicating a flow of the program and the path condition that is a condition under which a defect occurs in the execution path, the user (developer) can understand a cause of the occurrence of the defect, and thus it is easy to consider how to correct the source code.

In FIG. 4, the start point, the end point, and the path condition are displayed in a form of the comment of the program, and may be displayed in another form as long as correspondence with the statement/line can be understood.

<<Defect Analysis Process>>

Figure 5:
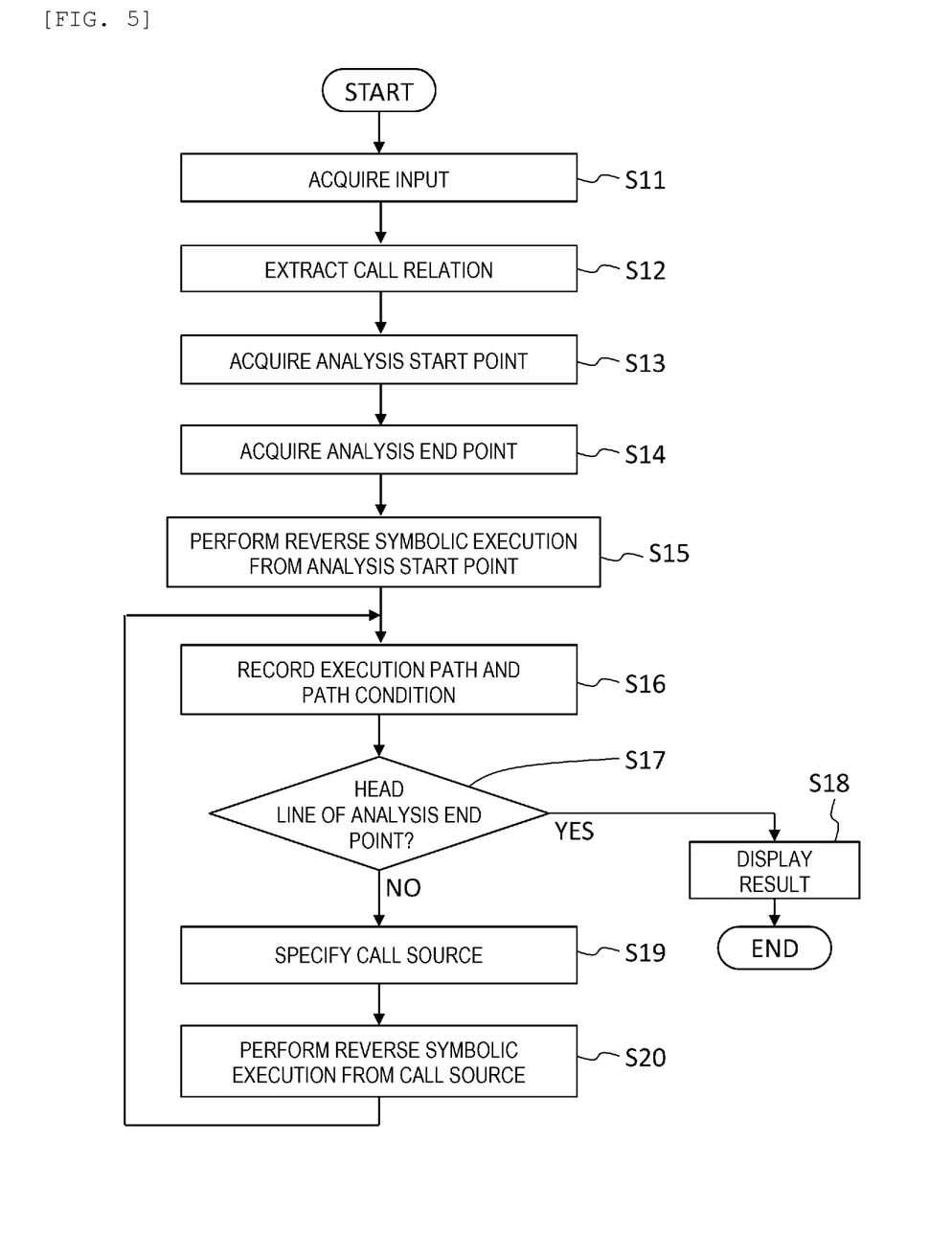
FIG. 5 is a flowchart of a defect analysis process according to the present embodiment.

FIG. 5 is a flowchart of a defect analysis process according to the present embodiment.

In step S11, the control unit 110 reads the source code 210, the program execution log 220, and the program specification 230, which are inputs.

In step S12, the call relation generation unit 111 extracts the call relation of the function from the read source code 210, and stores the extracted call relation in the function call relation database 130.

In step S13, the analysis start point acquisition unit 112 acquires and sets the analysis start point from the program execution log 220. When there are a plurality of candidates for the analysis start point, the analysis start point acquisition unit 112 acquires the analysis start point by inquiring the user (see the "designation" button 421 shown in FIG. 3).

In step S14, the analysis end point acquisition unit 113 acquires and sets the analysis end point (entry point) by inquiring the user.

In step S15, the symbolic execution engine 114 starts searching (reverse symbolic execution) from the analysis start point. Specifically, the symbolic execution engine 114 performs symbolic execution in a reverse direction toward a head line of the function.

In step S16, the symbolic execution engine 114 records the execution path and the path condition.

In step S17, the symbolic execution engine 114 proceeds to step S18 when a currently searched statement/line is a head line of the analysis end point (entry point) (step S17—YES), and proceeds to step S19 when the currently searched statement/line is not the head line of the analysis end point (step S17—NO).

In step S18, the symbolic execution engine 114 displays a result of the searching (reverse symbolic execution) (see the analysis result information display region 413 shown in FIG. 3).

In step S19, the symbolic execution engine 114 specifies the call source of the function.

In step S20, the symbolic execution engine 114 continues the searching from the call source of the function (reverse symbolic execution toward the head line of the function), and the process returns to step S16. In step S19, if a plurality of call sources of the function are specified, the symbolic execution engine 114 continues the searching from each call source. In addition, when the path condition is not satisfied in the middle of the searching, the searching is terminated.

<<Features of Defect Analysis Apparatus>>

The defect analysis apparatus 100 specifies, from the program execution log 220, a statement/line in which an exception (fault) related to a defect occurs, and sets the statement/line as the analysis start point. If the analysis start point cannot be specified as one, the defect analysis apparatus 100 presents candidates for the analysis start point to the user and sets a selected candidate as the analysis start point. The defect analysis apparatus 100 searches (reverse symbolic execution) the program from the analysis start point to the analysis end point (entry point) designated by the user in a direction reverse to a normal execution direction, and specifies and outputs execution paths 240, 431, 432, and 433 and the path condition (see FIGS. 3 and 4).

By referring to the execution paths 240, 431, 432, and 433, the user can understand under what condition and how the process proceeds the defect occurs in the program. In addition, it is possible to find a problem and correct the program. Further, the program corrected using the input parameter value 250 of the entry point that satisfies the path condition can be tested.

Modification

In the above embodiment, the defect analysis apparatus 100 obtains the input parameter value of the entry point that satisfies the path condition after the searching (reverse symbolic execution) is completed. The defect analysis apparatus 100 may solve the path condition or detect the exception (fault) in consideration of the range of the input parameter value or the return value described in the program specification 230.

Figure 6:
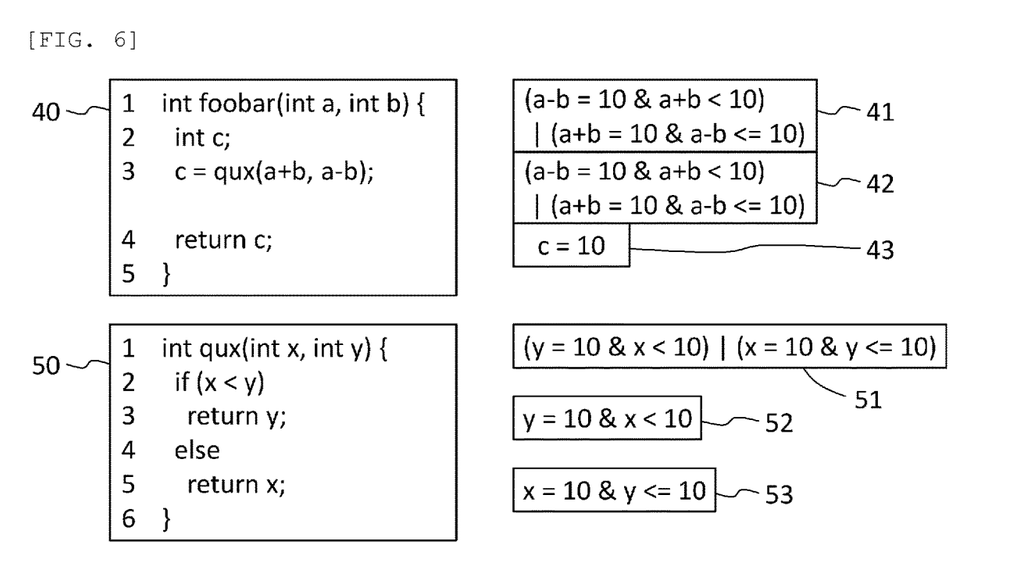
FIG. 6 is a diagram illustrating an execution path and a path condition according to a modification of the present embodiment.

FIG. 6 is a diagram illustrating the execution path and the path condition according to the modification of the present embodiment. FIG. 6 includes the source codes 210 of two functions of a function foobar 40 and a function qux 50. The function foobar 40 calls the function qux 50. In the program specification 230, a range of a first parameter of the function foobar 40 is 1 or more and 5 or less, a range of a second input parameter is 0 or more and 5 or less, and a range of a return value is 1 or more and less than 10 (see the analysis end point information display region 412 shown in FIG. 7 described later). Hereafter, the description will be continued on a premise that an abnormality of the return value occurs in the function foobar 40 and the function foobar 40 is designated as the entry point. In this case, the program execution log 220 includes a record of call of the function foobar 40, a record of call of the function qux 50, and a record of exception (abnormality) related to the return value of function foobar 40.

By analyzing the program execution log 220, the analysis start point acquisition unit 112 detects that the exception of the return value occurs in the function foobar 40. Since a line 4 of the function foobar 40 is a unique statement/line returned to the call source, the analysis start point acquisition unit 112 sets the start point in the line 4 of the function foobar 40.

Since the range of the return value of the function foobar 40 is 1 or more and less than 10, the analysis start point acquisition unit 112 sets, for example, "c=10" as a path condition 43 of the line 4. The analysis start point acquisition unit 112 may set the path condition 43 by inquiring the user.

The symbolic execution engine 114 searches the program in a direction opposite from the normal (forward) execution from the start point to the entry point.

In the case in FIG. 6, the symbolic execution engine 114 starts the searching from the line 3 of the function foobar 40, and reaches the call of the function qux 50 in the line 3. An execution path at this time point is from the line 4 to the line 3 of the function foobar 40.

The symbolic execution engine 114 determines that a return value of the function qux 50 is 10, and searches for a statement returning to the call source of the function qux 50. In the case in FIG. 6, the statement returning to the call source includes a line 3 and a line 5. The symbolic execution engine 114 continues the searching from each of the line 3 and the line 5.

The path condition in the line 3 is "y=10". In addition, a condition for branching to the line 3 in a line 2 is "x<y". Therefore, a path condition 52 in a case where the execution path is from the line 3 to the line 1 is "y=10" and "x<y", and as a result, "y=10" and "x<10" (described as "y=10 & x<10" in FIG. 6). Similarly, for the line 5, the path condition 53 in the case where the execution path is the line 5 and then from the line 3 to the line 1 is "x=10" and "y<=10" (described as "x=10 & y<=10" in FIG. 6).

As described above, a path condition 51 in the line 1 of the function qux 50 becomes "y=10 & x<10" or "x=10 & y<=10" (described as "(y=10 & x<10)|(x=10 & y<=10)" in FIG. 6).

The symbolic execution engine 114 returns to the line 3 of the function foobar 40, applies the path condition 51 to a variable of the function foobar 40, and a path condition 42 becomes "(a−b=10 & a+b<10)|(a+b=10 & a−b<=10)". The symbolic execution engine 114 further continues the search to reach a head line of the function foobar 40 that is an entry point, and obtains "(a−b=10 & a+b<10)|(a+b=10 & a−b<=10)" of a path condition 41.

The SMT solver 115 solves the path condition in accordance with a specification of an input parameter of the function foobar 40. The specification of the input parameter is that a of the first parameter is 1 or more and 5 or less, and b of the second parameter is 0 or more and 5 or less. By solving the path condition 41 in accordance with this condition, the SMT solver 115 obtains "a=5" and "b=5". Subsequently, the symbolic execution engine 114 performs (forward) symbolic execution from the entry point to the analysis start point using this value, and obtains "c=10" that is the initial path condition 43.

Figure 7:
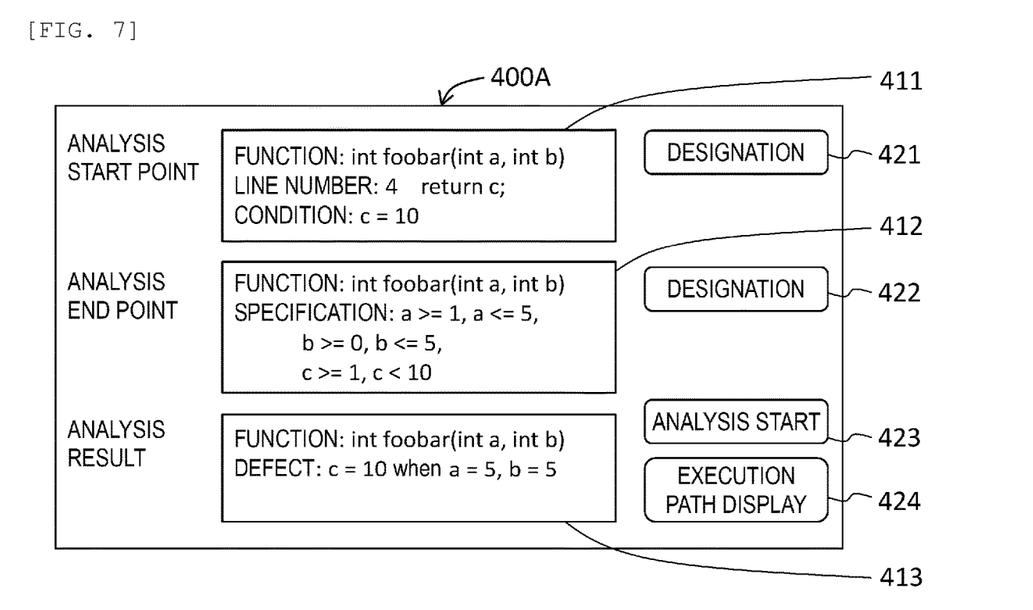
FIG. 7 is a configuration diagram of a screen of a defect analysis apparatus according to the modification of the present embodiment.

FIG. 7 is a configuration diagram of a screen 400A of the defect analysis apparatus 100 according to the modification of the present embodiment. Hereinafter, differences from the screen 400 (see FIG. 3) will be described.

Information of the entry point displayed in the analysis end point information display region 412 includes specifications of the input parameter and the return value. In addition, in addition to the input parameter value 250 of the entry point, a variable value of the start point in a case where a function that is the entry point is called with this value is displayed in the analysis result information display region 413.

In the above modification, "c=10" and the variable value are set as the path condition 43 at the start point, but the invention is not limited thereto. For example, a condition of "c<1|c>=10" that is outside the range of the return value in the specification, may be set. However, when the path condition is not a numerical value but a condition, a process performed the symbolic execution engine 114 or the SMT solver 115 that processes the condition may be delayed, or may be disabled in some cases.

Figure 8:
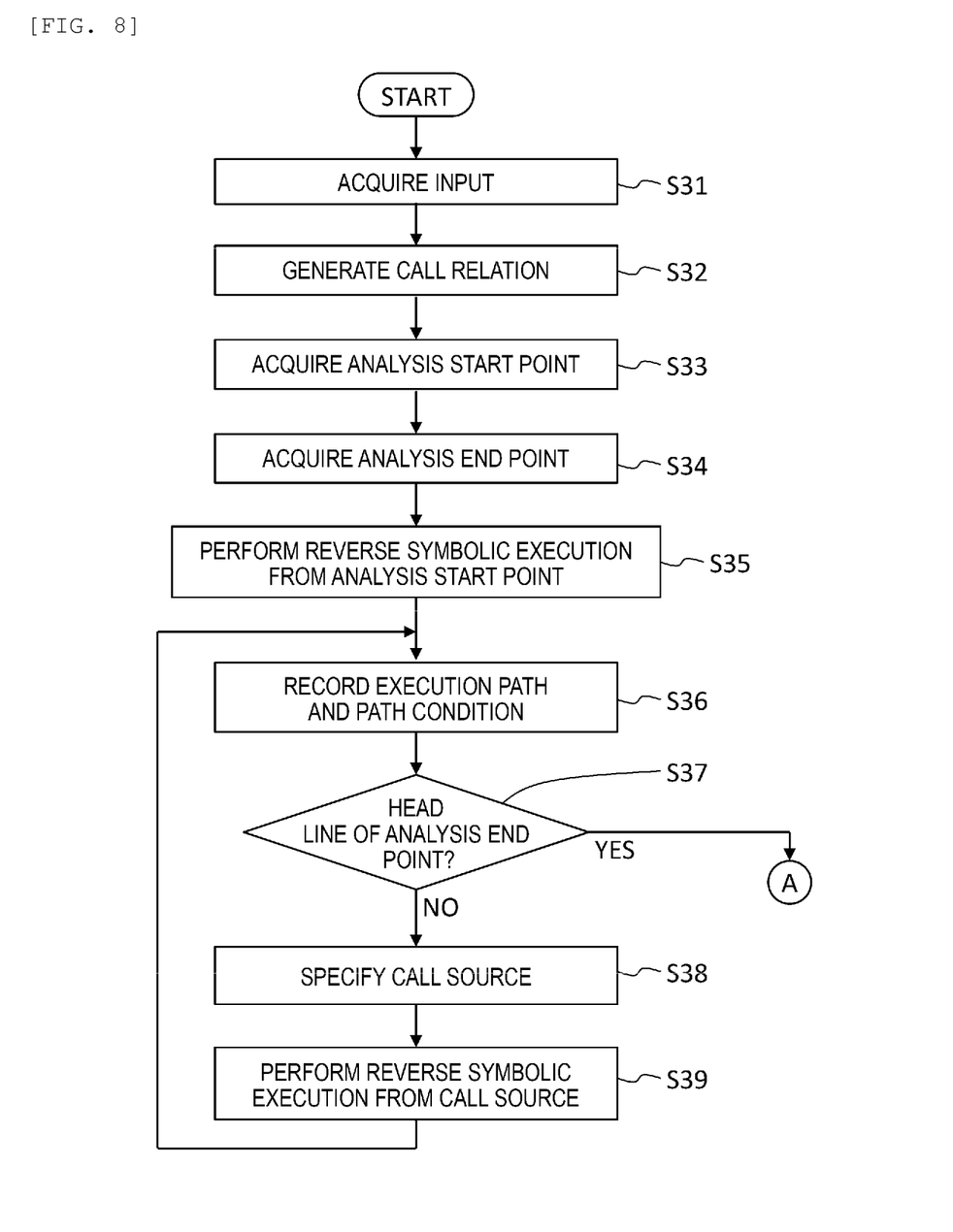
FIG. 8 is a flowchart (1) of the defect analysis process according to the modification of the present embodiment.
Figure 9:
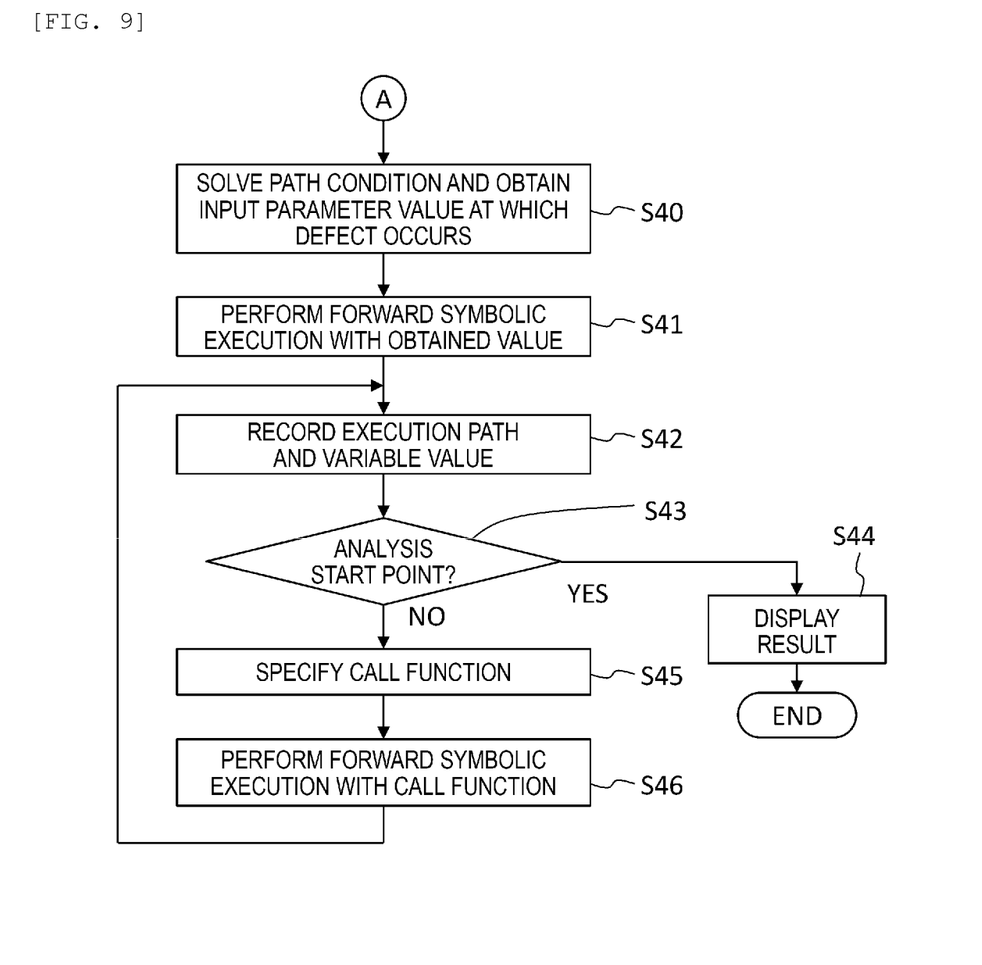
FIG. 9 is a flowchart (2) of the defect analysis process according to the modification of the present embodiment.

FIG. 8 is a flowchart (1) of the defect analysis process according to the modification of the present embodiment. FIG. 9 is a flowchart (2) of the defect analysis process according to the modification of the present embodiment.

Steps S31 to S39 are the same as steps S11 to S17, S19, and S20 shown in FIG. 5, respectively. However, in step S37, if a currently searched statement/line is a head line of the analysis end point (entry point) (step S37—YES), the symbolic execution engine 114 proceeds to step S40 shown in FIG. 9.

In step S40, the SMT solver 115 solves the path condition and obtains an input parameter value where a defect occurs. Specifically, the SMT solver 115 obtains the input parameter value 250 that satisfies the path condition in the entry point and a condition (specification) related to a range of the input parameter value of the function that is the entry point. In other words, the SMT solver 115 outputs the input parameter value in the entry point that satisfies the path condition. The SMT solver 115 may output a condition of the input parameter value in the entry point satisfying the path condition.

In step S41, the symbolic execution engine 114 performs the forward symbolic execution from the entry point with the input parameter value obtained in step S40.

In step S42, the symbolic execution engine 114 records the execution path and the variable value.

In step S43, the symbolic execution engine 114 proceeds to step S44 when a statement/line where a current forward symbolic execution is in performing is the analysis start point (step S43—YES), and proceeds to step S45 when the statement/line is not the analysis start point (step S43→NO).

In step S44, the symbolic execution engine 114 displays a result of the forward symbolic execution (see the analysis result information display region 413 shown in FIG. 7).

In step S45, the symbolic execution engine 114 specifies a function to be called in the function call.

In step S46, the symbolic execution engine 114 continues to perform the forward symbolic execution with the input parameter value at the time of call in the function to be called, and the process returns to step S42.

Modification: Exception

In the above embodiment and modification, as the exception, the division by 0, and the input parameter value (function call at a value outside the specification) and the return value (return from function call at a value outside the specification) contrary to those described in the program specification 230 are described. The exception may include call of a library function contrary to those of a specification of an input parameter of a library function called from the program (source code 210) or return from the call of a library function contrary to a specification of a return value of the library function, not limited to the program specification 230. The analysis start point acquisition unit 112 acquires a statement of a program in which an exception occurs from the execution log and as the analysis start point.

Other Modifications

Although some embodiments of the invention have been described above, these embodiments are merely examples, and the technical scope of the invention is not limited thereto. For example, in the above embodiment, the analysis start point acquisition unit 112 detects the occurrence of the exception from the program execution log and sets the start point, and may obtain the start point or the exception (path condition) in the start point by inquiring the user. When the program execution log does not record the occurrence of the exception, the user (developer) sets a start point by registering an exception occurrence position based on last recorded function call.

In the above embodiment, the program execution log includes a record of function call during the execution of the program. In contrast, the program execution log does not include the record of the function call, but may include information for determining the start point such as an exception occurrence position or an exception occurrence condition. In addition, the program execution log may include information related to diagnosis (for example, information output by assert in C language). The analysis start point acquisition unit 112 may set, as the start point, a statement (assert statement) where the information is output.

The invention can be implemented in various of other embodiments, and various changes such as omissions, substitutions, and the like can be made without departing from the spirit of the invention. These embodiments and modifications thereof are included in the scope and gist of the invention described in the description, and are also included in the invention described in the claims and equivalents thereof.

REFERENCE SIGNS LIST

100 defect analysis apparatus
111 call relation generation unit
112 analysis start point acquisition unit
113 analysis end point acquisition unit
114 symbolic execution engine
115 SMT solver (solver)
210 source code (program)
220 program execution log (execution log)
230 program specification
240 execution path
250 input parameter value
11, 12, 21, 22, 31, 32, 41, 42, 43, 51, 52, 53 path condition
411 information display region (analysis start point information display region)
412 information display region (analysis end point information display region)
413 information display region (analysis result information display region)
431, 432, 433 execution path

The invention claimed is:

1. A defect analysis apparatus comprising:
   a memory storing a defect analysis program;
   a processor coupled to the memory and programmed to execute the defect analysis program, which causes the processor to:
   acquire a statement of a program in which an exception occurs as an analysis start point from an execution log when analyzing a defect of the program based on the execution log of the program;
   acquire, each as an analysis end point, one or more functions selected from one or more functions each directly or indirectly calling a function including the analysis start point; and
   perform reverse symbolic execution from the analysis start point to the analysis end point and output an execution path in which the exception occurs; and
   a solver, wherein
   the processor calculates a path condition that is a condition under which the exception occurs,
   the solver outputs an input parameter value of a function serving as the analysis end point that satisfies the path condition, and
   the processor performs forward symbolic execution from call of the analysis end point performed at the input parameter value output by the solver to the analysis start point, and outputs a variable value at the analysis start point.

2. The defect analysis apparatus according to claim 1, wherein
   when the statement of the program in which the exception occurs cannot be specified as one, the analysis start point acquisition unit acquires, as the analysis start point, a statement selected from a plurality of statements in which the exception occurs.

3. The defect analysis apparatus according to claim 1, wherein the exception includes any one of
   division by 0, function call performed at a value outside a range of an input parameter value of a function described in a program specification of the program, return from the function call performed at a value outside a range of a return value of the function described in the program specification of the program, function call performed at a value outside a range of an input parameter value of a library function called by the program, and return from the function call performed at a value outside a range of a return value of the library function called by the program.

4. The defect analysis apparatus according to claim 1, wherein the solver outputs a condition of the input parameter value of the function serving as the analysis end point that satisfies the path condition or the input parameter value of the function serving as the analysis end point that satisfies the path condition.

5. A non-transitory computer-readable medium storing a defect analysis program that causes a computer to perform operations to analyze a defect of a program including an execution log of the program in an input, the operations including:

acquiring a statement of the program in which an exception occurs, as an analysis start point from the execution log;

acquiring, each as an analysis end point, one or more functions selected from one or more functions each directly or indirectly calling a function including the analysis start point;

performing reverse symbolic execution from the analysis start point to the analysis end point, and outputting an execution path in which the exception occurs;

calculating a path condition that is a condition under which the exception occurs;

outputting an input parameter value of a function serving as the analysis end point that satisfies the path condition; and performing forward symbolic execution from call of the analysis end point performed at the input parameter value to the analysis start point, and outputting a variable value at the analysis start point.

6. A defect analysis method of an apparatus for analyzing a defect of a program including an execution log of the program in an input, the method comprising:

acquiring a statement of the program in which an exception occurs, as an analysis start point from the execution log;

acquiring, each as an analysis end point, one or more functions selected from one or more functions each directly or indirectly calling a function including the analysis start point;

performing reverse symbolic execution from the analysis start point to the analysis end point, and outputting an execution path in which the exception occurs;

calculating a path condition that is a condition under which the exception occurs;

outputting an input parameter value of a function serving as the analysis end point that satisfies the path condition; and performing forward symbolic execution from call of the analysis end point performed at the input parameter value to the analysis start point, and outputting a variable value at the analysis start point.

* * * * *